Patented May 10, 1932

1,857,981

UNITED STATES PATENT OFFICE

LORIN B. SEBRELL, OF AKRON, OHIO, ASSIGNOR TO THE GOODYEAR TIRE & RUBBER COMPANY, OF AKRON, OHIO, A CORPORATION OF OHIO

ANTIOXIDANT

No Drawing.   Application filed May 4, 1931. Serial No. 535,095.

This invention relates to methods of treating rubber or rubber-like materials, such as balata and gutta percha, more particularly it pertains to the provision of rubber products having exceptionally high resistance to oxidation and other agencies which ordinarily cause premature decay of the materials.

It has heretofore been observed that rubber, gutta percha, balata and similar materials, when exposed to such agencies as air, sunlight and relatively high temperatures, either alone or in combination, tend to harden and, as a result, the natural elasticity and tensile strength thereof is soon greatly impaired or even completely destroyed.

It has also been observed that certain organic substances, such as hydroquinone, when incorporated in the above-indicated materials, materially retard the agencies of premature decay. However, the commercial use of such organic materials has heretofore been impracticable because they are not sufficiently soluble in rubber to permit of their uniform distribution through the latter material without subjecting the rubber to excessive milling, thus impairing the inherent elasticity and tensile strength of the compound.

This invention resides in the discovery that naphthanthraquinone, a material having the formula

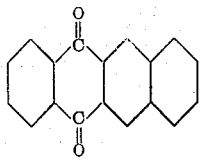

and the amino derivatives thereof, like hydroquinone, when incorporated in rubber, exhibit valuable properties as age retarders. However, unlike the hydroquinone compound, they are comparatively soluble in the rubber and, for that reason, may be readily incorporated into the latter with a minimum of milling. Naphthanthraquinone and its amino derivatives are readily prepared by the methods outlined in the Journal of Industrial and Engineering Chemistry, volume 22, page 157 (1930).

The materials may be used as antioxidants in substantially any of the ordinary rubber formulae. However, the following is a specific example of a formula in which they have been found by experience to be particularly effective.

| | Parts |
|---|---|
| Rubber | 100 |
| Zinc oxide | 5 |
| Sulfur | 3 |
| Hexamethylene tetramine (accelerator) | 1 |
| Stearic acid | 1.5 |
| Antioxidant | 1 |

In order to test the efficiency of naphthanthraquinone and its amino derivatives as age retarders, samples of rubber prepared in accordance with the preceding formula, in which they were employed as antioxidants, were subjected to vulcanization for varying periods of time. One set of these samples was subjected to physical tests immediately in order to ascertain the original tensile strength and elasticity thereof. A corresponding set of samples was weighed and then placed in an oxygen bomb and subjected to the action of oxygen at a pressure of 150 pounds per square inch at a temperature of 50 degrees C. for a period of 6 days. At the conclusion of this period of artificial aging, the samples were removed from the bomb and weighed to ascertain the percent increase in weight thereof due to absorption of oxygen. They were then subjected to physical tests corresponding to those conducted upon the unaged samples. The results of the tests are tabulated as follows:

| Cure | | Stress Kgs./cm.² at | | | Elong. at break | Per cent weight increase |
|---|---|---|---|---|---|---|
| Time in mins. | Temp. F.° | 500% elong. | 700% elong. | Break | | |
| NAPHTHANTHRAQUINONE | | | | | | |
| Original | | | | | | |
| 35 | 285 | 13 | 33 | 104 | 900 | |
| 50 | 285 | 17 | 52 | 132 | 850 | |
| 70 | 285 | 20 | 71 | 135 | 805 | |
| Aged in oxygen bomb six days at 50° C. | | | | | | |
| 35 | 285 | 12 | 38 | 90 | 845 | .17 |
| 50 | 285 | 17 | 64 | 132 | 815 | .38 |
| 70 | 285 | 23 | 92 | 155 | 785 | .11 |

| Cure | | Stress Kgs./cm.² at | | | Elong. at break | Per cent weight increase |
| --- | --- | --- | --- | --- | --- | --- |
| Time in mins. | Temp. F.° | 500% elong. | 700% elong. | Break | | |

AMINO NAPHTHANTHRAQUINONE

*Original*

| | | | | | | |
| --- | --- | --- | --- | --- | --- | --- |
| 35 | 285 | 16 | 50 | 138 | 870 | -------- |
| 50 | 285 | 24 | 92 | 146 | 775 | -------- |
| 70 | 285 | 30 | 129 | 178 | 750 | -------- |

*Aged in oxygen bomb six days at 50° C.*

| | | | | | | |
| --- | --- | --- | --- | --- | --- | --- |
| 35 | 285 | 20 | 82 | 118 | 765 | .07 |
| 50 | 285 | 29 | 125 | 150 | 730 | .28 |
| 70 | 285 | 42 | -------- | 172 | 695 | .32 |

It is apparent from the tabulated data that samples of rubber containing either naphthanthraquinone or its amino derivatives absorb only relatively small proportions of oxygen and that the original tensile strength and elasticity thereof is only slightly impaired under the relatively severe treatment in the oxygen bomb. This test corresponds to several years of natural aging.

Corresponding samples of rubber containing no antioxidant or age retarder, upon subjection to a similar period of artificial aging, are reduced to resinous masses substantially devoid of tensile strength and elasticity. The antioxidants are particularly desirable from a commercial viewpoint because they may be prepared from relatively inexpensive ingredients and the reactions involved are quite simple in character. Also, the yields obtained are exceptionally high. As previously indicated, the materials are readily milled into the rubber compounds. Furthermore, the materials are devoid of disagreeable odors and are not objectionable to workmen employed in handling them.

Although the preferred forms of the invention have been disclosed and described in detail, it will be apparent to those skilled in the art that the invention is not so limited but that various modificaions may be made therein without departing from the spirit of the invention or from the scope of the appended claims.

Claims:—

1. A method of treating rubber, gutta percha and balata which comprises incorporating therein a naphthanthraquinone.

2. A method of treating rubber which comprises incorporating therein naphthanthraquinone.

3. A method of treating rubber which comprises incorporating therein an amino derivative of naphthanthraquinone.

4. A method of treating rubber which comprises incorporationing therein amino naphthanthraquinone.

5. A method of treating rubber which comprises incorporating therein an accelerator of vulcanization and amino naphthanthraquinone.

6. A rubber product that has been vulcanized in the presence of a naphthanthraquinone.

7. A rubber product that has been vulcanized in the presence of naphthanthraquinone.

8. A rubber product that has been vulcanized in the presence of amino naphthanthraquinone.

In witness whereof, I have hereunto signed my name.

Signed at Akron, in the county of Summit and State of Ohio, U. S. A., this 1st day of May, 1931.

LORIN B. SEBRELL.